Figure 1:
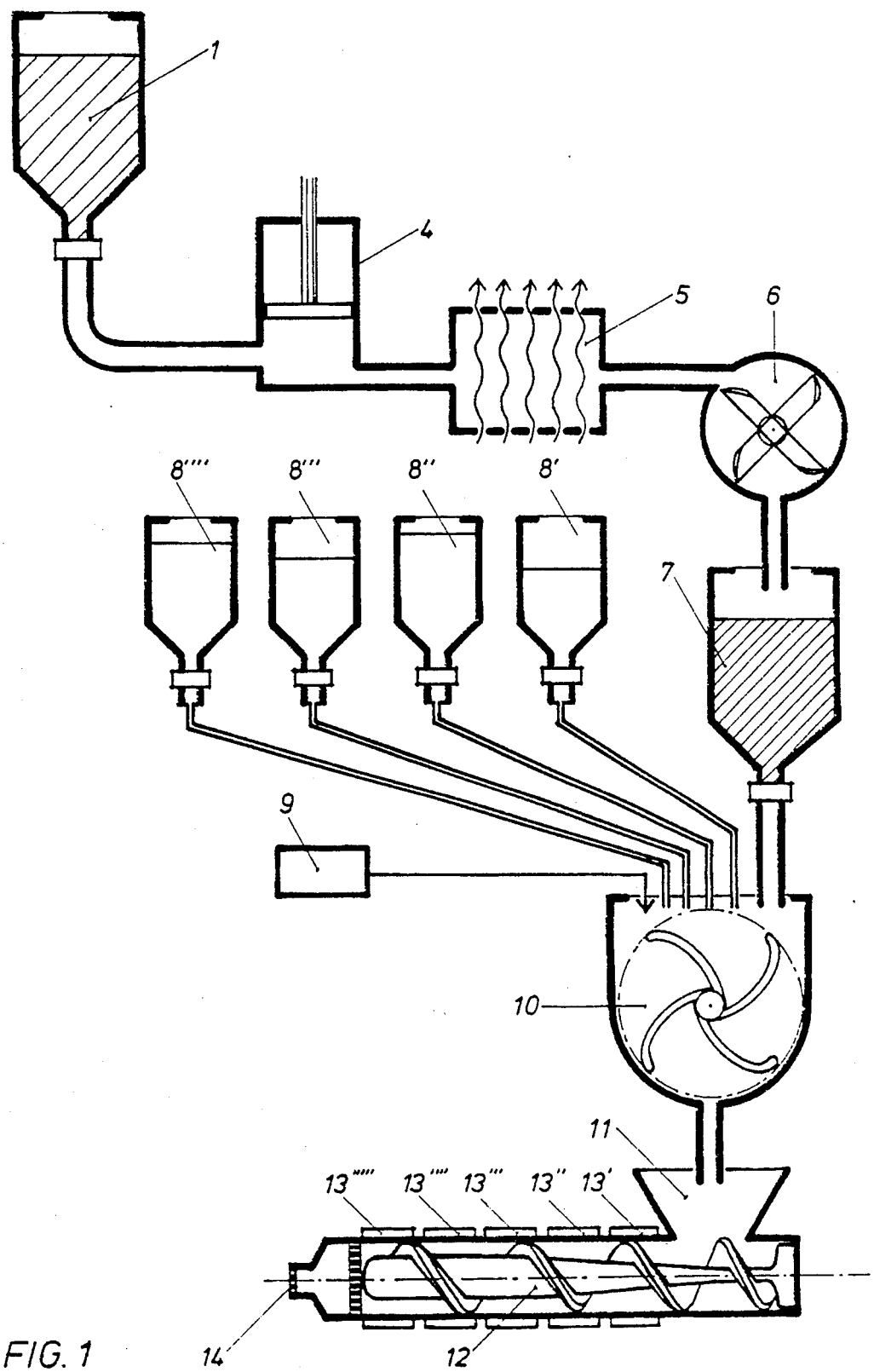

United States Patent [19]

Lehn et al.

[11] Patent Number: 4,702,929

[45] Date of Patent: Oct. 27, 1987

[54] METHOD FOR THE MANUFACTURING OF MUNCHIES

[76] Inventors: Carsten J. Lehn, Ejlskovvej 75, Søndersø, Denmark, 5471; John Poyser, Vestergade 2, Bogense, Denmark, 5400

[21] Appl. No.: 765,314

[22] Filed: Aug. 13, 1985

[30] Foreign Application Priority Data

Aug. 30, 1984 [DK] Denmark .............................. 4141/84

[51] Int. Cl.⁴ ................................................ A23K 1/10
[52] U.S. Cl. .................................... 426/635; 426/646; 426/805
[58] Field of Search ..................... 426/635, 646, 805

[56] References Cited

U.S. PATENT DOCUMENTS

| | | |
|---|---|---|
| 982,711 | 1/1911 | Ellis . |
| 1,018,415 | 2/1912 | Ellis . |
| 3,256,093 | 6/1966 | Hinton et al. ........................ 426/805 |
| 3,882,257 | 5/1975 | Gagle .................................. 426/805 |
| 4,032,665 | 6/1977 | Miller et al. . |
| 4,145,447 | 3/1979 | Fisher et al. ........................ 426/805 |
| 4,419,372 | 12/1983 | Greene et al. ....................... 426/805 |

FOREIGN PATENT DOCUMENTS

| | | |
|---|---|---|
| 100918 | 5/1965 | Denmark . |
| 642739 | 2/1937 | Fed. Rep. of Germany . |
| 1297451 | 6/1969 | Fed. Rep. of Germany . |
| 2841487 | 9/1979 | Fed. Rep. of Germany ...... 426/805 |
| 3032959 | 3/1982 | Fed. Rep. of Germany ...... 426/805 |
| 1042559 | 4/1966 | United Kingdom . |
| 1085494 | 10/1967 | United Kingdom . |

*Primary Examiner*—R. B. Penland
*Attorney, Agent, or Firm*—Merchant, Gould, Smith, Edell, Welter & Schmidt

[57] ABSTRACT

A munchy, especially for dogs and cats, is manufactured from rawhide or spetches and/or split thereof by dehydration, pressing and chopping of the resulting product, and extrusion of same together with a starch material through several heating zones and a die plate, whereupon the extruded product may be cut.

By this method it becomes possible to use the hide wastes, available in large quantities from the production of leather, for the manufacturing of munchies and snacks for dogs and cats, thus sparing proper hide material that can now be used for finer applications.

13 Claims, 2 Drawing Figures

METHOD FOR THE MANUFACTURING OF MUNCHIES

The present invention relates to a method for the manufacturing of snacks or munchies for pets, especially for dogs and cats, from hide wastes and a starch material.

It is known to manufacture munchies for dogs from dried hides which are pulled to pieces and mixed with equal portions of tapioca powder, and the shape and hardness of the munchy are created and regulated by means of a kind of moulding press. The hide material used according to the known method consists of proper fragments of unhaired hides or whole hides. The demand for munchies is now so considerable that the quantities available of cutting-offs are too small to be able to meet it, and consequently proper hides that could be used for other purposes are cut up to be used for the manufacturing of munchies.

It is the object of the present invention to provide a method by which it is made possible to use cheap tannery wastes, for example spetches or spetches split, same being produced in large quantities by liming and unhairing before the very tanning process and which cannot be utilized today. It will be possible to utilize these waste quantities with safe removal, so that problems in that respect are avoided, just as it can be avoided that proper hide material which could be used for the production of leather and skins is just cut up in order to be consumed by domestic animals. So far it has not been possible in a fairly cheap manner to remove or neutralize the large quantities of sulphur and lime which after the unhairing process are still contained in these wastes.

The material contains sulphur compounds as follows:
(a) as not-washed out chemical ($Na_2S_2$),
(b) as partly bound SH— bond (active),
(c) as stable —S— bond, bound to the hide.

The sulphur and lime content brings about a pH value of 12-13.

A normal neutralization of spetches and spetches split with a known acid will immediately liberate hydrogen sulphide, same being a very harmful evil-smelling gas that affects the nervous system. Still it would be possible to prove the presence of sulphur in the neutralized product in fairly large quantities.

According to the present invention a method is provided that satisfies the above-mentioned objects, said method being characterized in that spetches and/or spetches split is dehydrated by pressing or by another dehydrating method.

The dehydration by pressing can be carried out in any suitable manner, for example by means of a frame filter press or a piston press. A natural dehydration by letting the material stand on a grating is sufficient but time-consuming.

The chopping of the dehydrated washed-out product may according to the invention be carried out in a high-speed mincing machine or a "meat grinder", preferably a high-speed mincing machine with a 3-6 mm sieve, thereby obtaining after extrusion a stable attractive product with an appropriate structure.

The method of manufacturing differs from known methods for the treatment of spetches and spetches split in that the raw material is not neutralized directly, but that the activated sulphur is transformed by means of a buffer action, whereupon the salt generated (sulphide) is encapsulated and bound with a starch and the heat-generated hide gelatine, respectively. The limed and unhaired wastes are dehydrated in alkaline state pH 12-13 and are mixed with starch-containing materials by vigorous chopping and aeration. Thereupon, the mixture is extruded under specified conditions and is shaped through dies for rods with a diameter of 5-20 mm, preferably 10-16 mm, or dies for sheets with the dimensions of 2-5 mm×15-30 mm, preferably 3 mm×25 mm, or dies with similar sectional areas.

Out of consideration for the appearance of the product the drying must be carried out at low temperatures: 10° C.-30° C., preferably at 15° C.-25° C.

The drying is preferably carried out by compulsory ventilation by controlling the humidity of the atmosphere and preferably by the intake of light heat. The drying temperature must not exceed 30° C.

As starch agent can be used any material which together with the pre-treated tannery wastes by extrusion can become solid with good biting resistance and with good coherence powers against the constituents in munchies. According to the invention one or more starch materials are preferably used and selected among tapioca, potato starch, barley groats, ordinary wheat flour for bread, wheat flour for the manufacturing of biscuits, wheat bran, rye grains and wheat grains, thereby obtaining the desired qualities.

When spetches are used starch material in a quantity of 40%-60% is advantageously added, calculated on the total quantity of spetches and starch material, and when split is used starch material in a quantity of 20%-35% is advantageously added, calculated on the total quantity of split and starch agent.

The colouring additive used, for example a red colouring additive such as E124, can be used in a quantity of up to 2%, flavouring additives may for example be fishmeal in a quantity of up to 3% or a synthetic flavouring such as chicken, chocolate or beef flavour.

To improve the keeping quantities an antioxydant, for example sorbic acid (sorbinat) in a quantity of up to 0.5%, is advantageously added.

The products differ from those already marketed in that they are slightly alkaline, same having the effect that after consumption the dog or cat calms down—without deleterious effects, as the gastric juice is partially neutralized. Furthermore, the product has a high lime and iron content as well as a content of micronutrients such as potassium, chlorine and phosphorous.

Moreover, analyses show that the heavy metals, chromium, manganese, nickel, cadmium and lead are not present.

Already after the stach material has been added after the chopping the pH value has fallen to 8-9. To obtain a marketable product with a shiny surface the pH of the raw material mixture must prior to the extrusion be on the alkaline side, i.e. 7.5-9.0.

By extrusion during the supply of heat the pH value will be further lowered at the same time as the gelatine and the starch material gelatinizate partly, causing the material to cohere, same material upon cooling acquiring an appropriate hardness and biting resistance, corresponding to what is known from existing munchies. And the denaturation of the proteins during the extrusion gives the product a muscle-like structure.

Thus, the temperatures induced on the heating jackets of the extruder must be 100° C.-170° C., preferably 145° C.-160° C., in the center zones, and in the final zone 100° C.-145° C., preferably 110° C.-120° C., in order that the product temperature at the extruder exit is 90° C.–130° C., preferably 104° C.–112° C.

Figure 2:
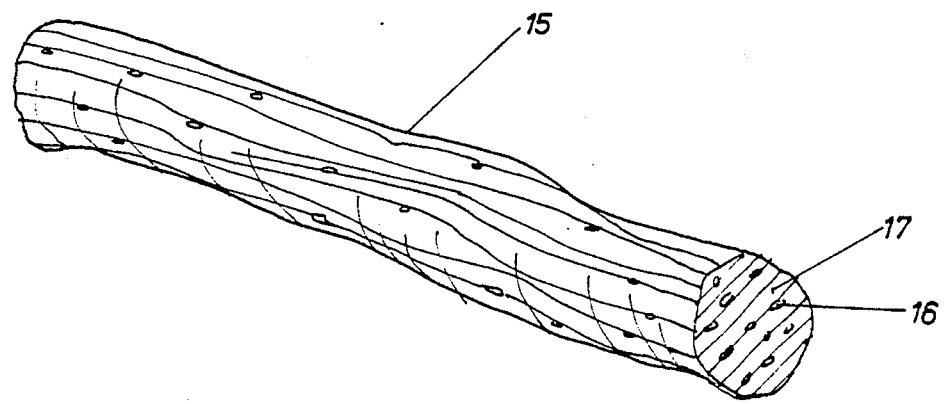

The method according to the invention will be further described in the following with reference to the drawing, wherein FIG. 1 in the form of a block diagram shows the method, and FIG. 2 shows an example of a munchy manufactured according to the method.

Spetches and/or spetches split is stored in a container 1, from where it is led to a press 4, for example a frame filter press or a piston press. The dehydrated product may be dried in a drier 5, whereupon same is chopped in a high-speed mincing machine or a "meat grinder" 6 and led to an intermediate store 7. From here the material is led to a suitable mixer 10 together with one or more kinds of starch materials from storage containers 8', 8'', 8''', 8'''' and possibly colouring and flavouring additives from a container 9. Agents for improving the keeping qualities, for example sodium sulphite, and an antioxydant, for example sorbic acid, may also be added.

After the mixing, which can be carried out batchwise or continuously, the final mixture is led to a hopper 11 on an extruder 12 which can be supplied with heat in the zones 13', 13'', 13''', 13'''', 13''''' individually, and from where the final material is extruded through a die 14.

The flavouring additives used may for instance be fishmeal in a quantity of up to 3% or a synthetic flavour such as chicken, chocolate or beef flavour. The colouring additive is a biologically tolerable colouring additive, for example a colouring that is used for foodstuffs, and a red colouring additive, such as E214, may for example be used.

In and after the extrusion process the material is cooled to such an extent that it becomes coherent and attains a sufficient strength for the further handling, whereupon said material is cooled entirely and is broken, chopped or cut to pieces of a desired length for packing and sale.

A granulate of the manufactured mass may, if desired, without extrusion be used as a protein supplement in the manufacturing of for example dog biscuits and similar kinds of dry animal feed.

In FIG. 2 an embodiment of a munchy 15 manufactured by the method according to the invention is shown. The spetches appear in the form of small pieces 16 surrounded by a matrix 17, said matrix being composed of the added starch material, same material joining together the spetches and the spetches split fragments.

The method according to the invention is further elucidated by the following examples.

In the examples the following raw materials are used:

Spetches and spetches split from tannery A (LLa and LLSa).

Spetches of inferior quality from tannery B (LLb).

As starch component are used tapioca, potato starch, barley groats, wheat flour (ordinary bread flour), wheat flour (biscuit flour), wheat bran and wheat grains.

As extruder is used a Werner & Pfleiderer C37 or another double screw extruder with L/D <23 with simple worm and with a die plate with holes 6¼ mm and with 5 heating zones, where the material is heated intensely in zones 3 and 4 and is cooled in zone 5, or a Brabender 20DN without compression or another single screw extruder with L/D <20, where the material is heated intensely in zones 1 and 2 and is cooled in zone 3, or a pill press of the Pill-Matic brand, provided with three band heating elements for the heating of the substance inside the press and in the die. There may also be used a vacuum stopper, known from the sausage industry, thereby increasing the rate of production substantially.

EXAMPLE 1

LLa, LLSa, tapioca and potato starch are used in the ratio of 1:1:1:1 as raw materials. The leather material is chopped in a high-speed mincing machine. The extruder is provided with a die plate with holes (2×6¼ mm) and the 3–4 final zones of same are supplied with heat to obtain a material temperature of approximately 109° C.

The shape of the manufactured product is stable and the surface of same is attractive and shiny.

EXAMPLE 2

The same raw materials as in example 1 are used, but the leather material is chopped in a "meat grinder" with a 3 mm sieve, whereupon it is heated intensely in zones 3 and 4 and is cooled slightly in zone 5. The product is attractive with the "pieces of meat" being of an appropriate size. Experiments where the pH of the mixture is lowered from approximately 9.3 to approximately 5.7 by adding citric acid result in a lighter product with a dull surface.

EXAMPLE 3

Example 2 is repeated, using, however, LLb instead of LLSa and LLa, thereby obtaining a result just as favourable.

EXAMPLE 4

By means of the same equipment and adjustment as in example 2 munchies are manufactured from LLb, biscuit flour, wheat flour and barley groats in the ratio of 10:4:1:5. The structure of the product is somewhat looser than in the previous examples, but the product displays a beautiful play of colours because of the barley groats.

EXAMPLE 5

Example 4 is repeated, however the material temperature is raised, and furthermore a little potato starch is added, thus improving the coherence of the product in which the starch components have melted into each other.

EXAMPLE 6

Example 2 is repeated with the following raw materials: LLb, biscuit flour, wheat bran, barley groats and potato starch in the ratio of 25:8:2:10:5, both with and without heat stable red colouring, thereby obtaining in both cases a coherent, rod-shaped product with a dark play of colours on a red and light brown background, respectively.

EXAMPLE 7

Example 2 is repeated with LLB, bread flour and wheat bran in the ratio of 5:4:1 plus red colouring, thereby obtaining a good coherent product with uniform colouring without any play of colours.

EXAMPLE 8

Examples 6 and 7 are repeated with a single screw extruder (Brabender 20DN). As regards appearance and function the products correspond entirely to the products manufactured by means of a double screw extruder.

EXAMPLE 9

Preferred embodiment for the manufacturing of munchies.

Spetches or split is cleaned, chopped and possibly neutralized slightly to a pH of approximately 8.0, whereupon it is mixed with the starch material, flavouring additives and antioxydant. The mixture is then allowed to stand in order to "mature" a little, whereupon same is led to an extruder where it is pressed and heat-treated with a temperature in the final zone of 110° C.–120° C., and with a travelling time in the extruder of 2–3 minutes. The mixture is extruded out onto a conveyor, where it is dehydrated and cut off into lengths, then being ready for sale.

The munchy is manufactured from the following components.

| | |
|---|---|
| Spetches | 45% |
| Wheat flour (ord.) | 45% |
| Wheat grains | 5% |
| Colouring additive, E124 | 2% |
| Sodium sulphite | 1% |
| Sorbic acid | 0.1–0.2% |
| Fishmeal | the balance |

Wheat grains may be replaced completely or partly by rye grains without the product being changed.

EXAMPLE 10

For the manufacturing of a "semi-moist" edible snack product according to the invention the same manufacturing method and composition as in example 9 are used. However, 5% molasses and a little stabilizer and emulsifier are added. As emulsifier is preferably used Amidan SDMT and as stabilizer SOBALG FD 155. When the product is to be used for cats codliver and yeast are preferably added too.

A typical analysis of the product will be as follows:

| | |
|---|---|
| Calcium | 700 ppm (550) |
| Sulphur (oxidation level $\geq$ 0) | 70 ppm (70) |
| Sulphur (oxidation level < 0) | 0 ppm (0) |
| Protein | 35% (65%) |
| Fat | 2.5% (2.5%) |
| Dry matters | 86% (86%) |
| pH in 10% suspension | 7.5 (5.4) |
| Potassium | 90 ppm |
| Iron | 70 ppm |

The bracketed figures are analyses for the existing products known.

The dogs and cats who have been introduced to products manufactured according to the present invention have without reservation started chewing and eating them. One of the dogs was introduced to three different products manufactured by the present method from spetches and spetches split as well as for three different products manufactured by the traditional method from hide wastes. The dog sniffed at and licked all of the products, but the products manufactured by the method of the present invention from spetches and spetches split were eaten first.

As regards appearance the products manufactured by the present method differ from existing munchies in that their surface is shiny and smooth.

We claim:
1. A method of manufacturing snacks for pets, said method consisting essentially of the steps of:
    (a) providing tannery wastes produced from liming and including sulfur and lime therein;
    (b) dehydrating the tannery wastes to form a dehydrated product;
    (c) chopping the dehydrated product;
    (d) mixing the chopped dehydrated material with a starch material to form a starch-containing mixture;
    (e) extruding the starch-containing mixture at an elevated temperature using an extruder with a worm mounted on a die plate with holes about 6¼ millimeters in diameter and with five heating zones, and wherein the material is heated intensely in the second and fourth zones and is cooled in the fifth zone; and
    (f) cooling the extruded mixture.
2. The method according to claim 1, wherein the pH-value in the starch-containing mixture prior to the extrusion is adjusted to within the range of 7.5–9.0.
3. The method of claim 1 wherein the temperature in the central heating zone of the extruder is 100° C.–170° C. and in the final zone 100° C.–145° C.
4. The method of claim 1, wherein the dehydrated product is chopped in a high-speed mincing machine or a meat grinder with a 3–6 mm sieve.
5. The method of claim 1 wherein the dehydrated product is dried prior to step (b) at a temperature of between 10° C. and 30° C.
6. The method of claim 5 wherein the starch material used is a mixture selected from the group consisting of:
    (a) tapioca starch and potato starch;
    (b) wheat flour and potato starch;
    (c) wheat flour and wheat bran;
    (d) biscuit flour, wheat flour and barley groats; and
    (e) biscuit flour, wheat bran, barley groats and potato starch.
7. The method of claim 1 wherein the starch material is selected from the group consisting of tapioca starch, potato starch, barely groats, wheat flour, wheat bran, rye grains, wheat grains or mixtures.
8. The method of claim 7, wherein the snack is manufactured from the following components: approximately 45% spetches, approximately 45% ordinary wheat flour, approximately 5% wheat grains, approximately 2% colouring, approximately 1% sodium sulfite, and approximately 0.1–0.5% sorbic acid.
9. The method of claim 8, wherein the snack further comprises approximately 5% molasses, an effective amount of an emulsifier, an effective amount of a stabilizer, wherein the molasses, emulsifier and stabilizer are added to the mixture prior to step (d).
10. The method of claim 1 wherein mixing the chopped, dehydrated material with a starch material includes adding 3% of flavor additives to said mixture.
11. A method of manufacturing snacks for pets, said method consisting essentially of the steps of:
    (a) providing tannery wastes produced from liming and including sulfur and lime therein;
    (b) dehydrating the tannery wastes to form a dehydrated product;

(c) chopping the dehydrated product;
(d) forming a mixture of said dehydrated product with a starch material; said step of forming said mixture including providing the following in said mixture, by weight:
  (i) about 45% ordinary wheat flour;
  (ii) about 45% of said chopped dehyrated product;
  (iii) about 5% wheat grains;
  (iv) about 2% coloring;
  (v) about 1% sodium sulfite; and
  (vi) between about 0.1 and 0.5% sorbic acid;
(e) extruding the mixture at an elevated temperature using an extruder with a worm mounted on a die plate with holes about 6¼ millimeters in diameter and with five heating zones, and wherein the material is heated intensely in the second and fourth zones and is cooled in the fifth zone; and
(f) cooling the extruded mixture.

12. A method of manufacturing snacks for pets, said method consisting essentially of the steps of:
(a) providing tannery wastes produced from liming and including sulfur and lime therein;
(b) dehydrating the tannery wastes to form a dehydrated product;
(c) chopping the dehydrated product;
(d) mixing the chopped dehydrated material with a starch material to form a starch-containing mixture;
  (i) said step of mixing excluding from the starch-containing mixture any substantial amount of added gelatin, salt and intestine material;
(e) extruding the starch-containing mixture at an elevated temperature using an extruder with a worm mounted on a die plate with holes about 6¼ millimeters in diameter and with five heating zones, and wherein the material is heated intensely in the second and fourth zones and is cooled inthe fifth zone; and
(f) cooling the extruded mixture.

13. A method of manufacturing snacks for pets, said method consisting essentially of the steps of:
(a) providing tannery wastes produced from liming and including sulfur and lime therein;
(b) dehydrating the tannery wastes to form a dehydrated product;
(c) chopping the dehydrated product;
(d) forming a mixture of said dehydrated product with a starch material; said step of forming said mixture including providing the following in said mixture, by weight:
  (i) about 45% ordinary wheat flour;
  (ii) about 45% of said chopped dehydrated product;
  (iii) about 5% wheat grains;
  (iv) about 2% coloring;
  (v) about 1% sodium sulfite; and
  (vi) between about 0.1 and 0.5% sorbic acid;
(e) extruding the mixture at an elevated temperature using an extruder with a worm mounted on a die plate with holes about 6¼ millimeters in diameter and with five heating zones, and wherein the material is heated intensely in the second and fourth zones and is cooled in the fifth of the zone; and
(f) cooling the extruded mixture;
(g) said step of forming the mixture of said dehydrated product including excluding from the mixture any substantial amounts of added gelatin, salts and intestine material.

* * * * *

UNITED STATES PATENT AND TRADEMARK OFFICE
CERTIFICATE OF CORRECTION

PATENT NO. : 4,702,929
DATED : 10/27/87
INVENTOR(S) : Lehn et al.

It is certified that error appears in the above-identified patent and that said Letters Patent is hereby corrected as shown below:

Col. 2, lines 44-45, "dow-n" should be --down--.

Col. 5, line 50, "$\geq$" should be --$\geq$--.

Col. 8, line 2, "inthe" should be --in the--.

Col. 8, line 29, "of the zone" should be --zone--.

Signed and Sealed this

Twenty-seventh Day of June, 1989

Attest:

DONALD J. QUIGG

*Attesting Officer*  *Commissioner of Patents and Trademarks*